United States Patent
Lee

(10) Patent No.: US 7,733,911 B2
(45) Date of Patent: Jun. 8, 2010

(54) ERROR CONTROL IN MULTICAST VIDEO DISTRIBUTION

(75) Inventor: Jack Yiu-bun Lee, Shatin (HK)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/754,184

(22) Filed: May 25, 2007

(65) Prior Publication Data

US 2007/0226577 A1     Sep. 27, 2007

Related U.S. Application Data

(63) Continuation of application No. 09/945,345, filed on Aug. 30, 2001, now Pat. No. 7,224,702.

(60) Provisional application No. 60/228,772, filed on Aug. 30, 2000.

(51) Int. Cl.
*H04J 3/24*     (2006.01)

(52) U.S. Cl. ........................ 370/473; 714/748

(58) Field of Classification Search ........................ None
See application file for complete search history.

(56) References Cited

U.S. PATENT DOCUMENTS

| | | | |
|---|---|---|---|
| 5,563,895 A | 10/1996 | Malkamaki et al. | |
| 5,790,527 A | 8/1998 | Janky et al. | |
| 5,793,744 A | 8/1998 | Kanerva et al. | |
| 6,148,005 A * | 11/2000 | Paul et al. | 370/469 |
| 6,278,716 B1 * | 8/2001 | Rubenstein et al. | 370/432 |
| 6,904,464 B1 * | 6/2005 | Van Langen et al. | 709/237 |
| 7,187,677 B2 | 3/2007 | Torsner et al. | |

* cited by examiner

*Primary Examiner*—Frank Duong
(74) *Attorney, Agent, or Firm*—Kenyon & Kenyon LLP

(57) ABSTRACT

An embodiment of the invention includes an efficient error-control system and method for recovering packet losses, especially losses in distributing multicast video over broadband residential networks. Preferably, unlike most existing error-control algorithms designed for Internet multicast, the system and method does not employ substantial feedback suppression. Preferably, the system and method does not employ substantial multicasted retransmission. Preferably, the system and method does not employ substantial parity retransmission. Preferably, the system and method does not employ substantial local loss recovery. The system and method integrates two existing classes of error-control algorithms: Automatic Repeat Request (ARQ) and Forward Error Correction (FEC), to reduce traffic overhead and achieve scalability.

33 Claims, 14 Drawing Sheets

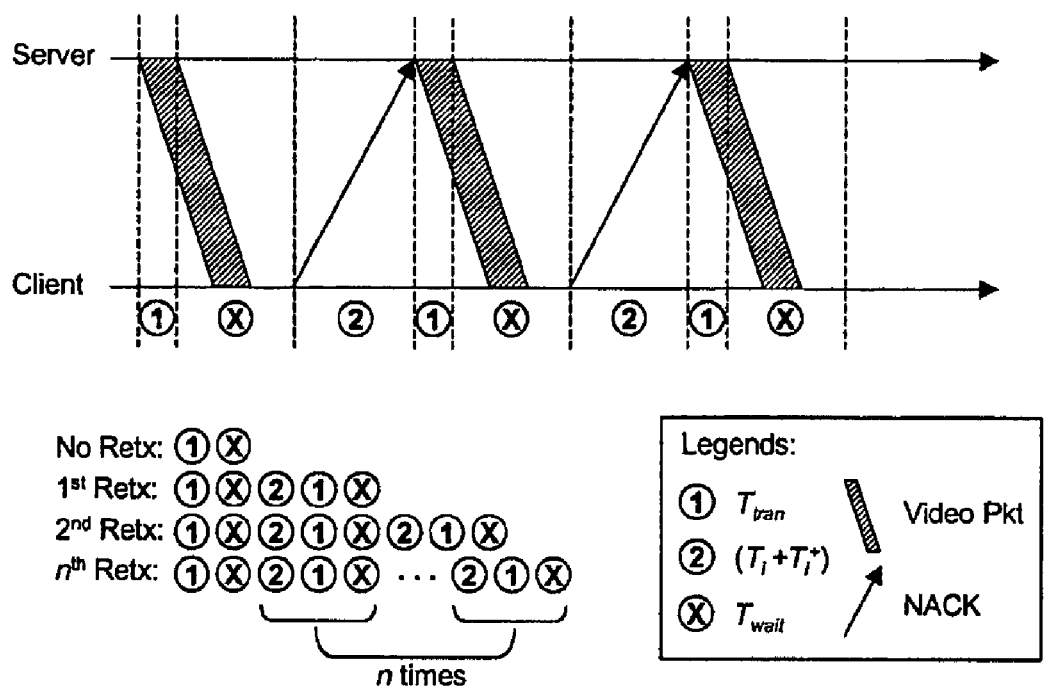
Fig. 3. Worst-case retransmission scenario for the ARQ algorithm.

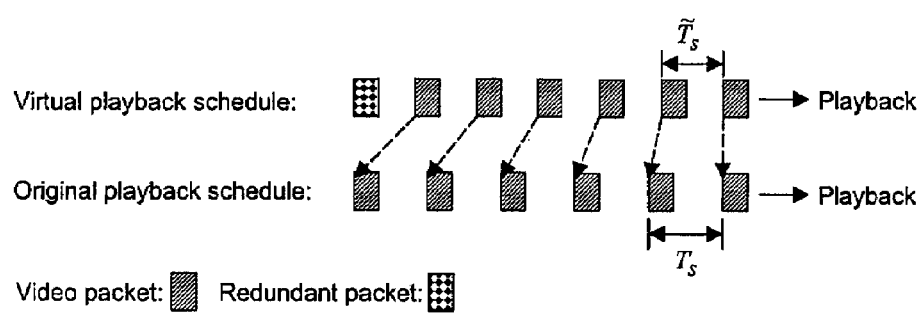
Fig. 4. Relation between the virtual playback schedule and the original playback schedule under FEC.

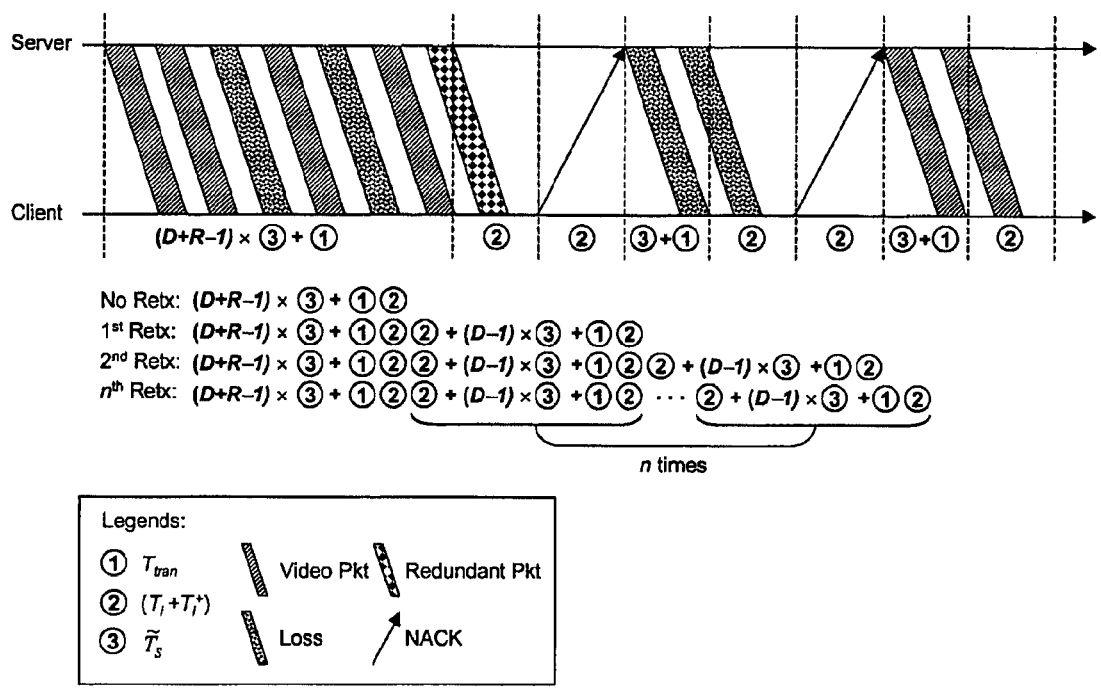
Fig. 5. Worst-case retransmission scenario for passive recovery mode of the hybrid ARQ/FEC algorithm.

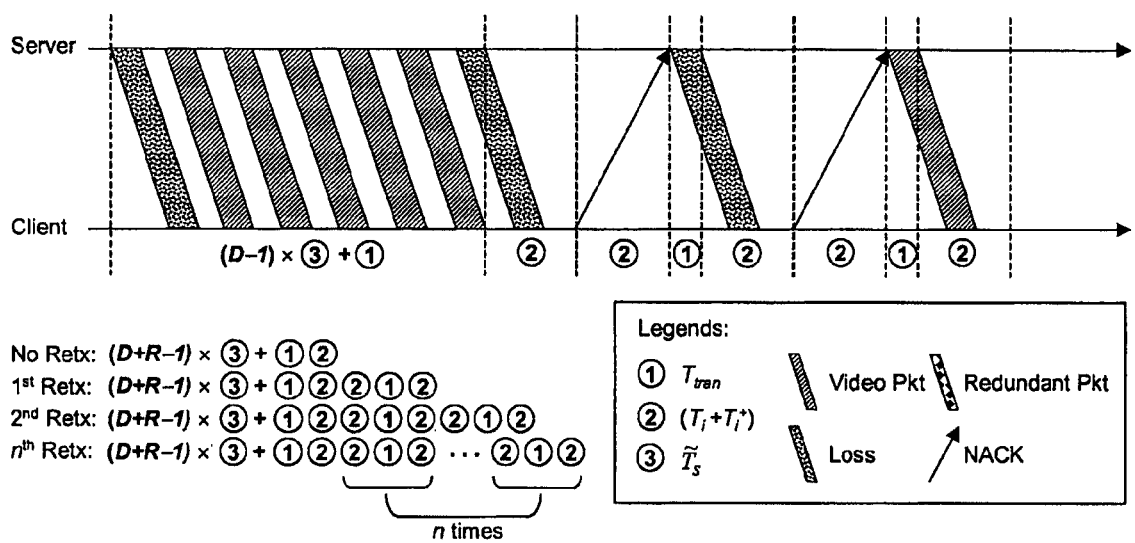
Fig. 6. Worst-case retransmission scenario for active recovery mode of the hybrid ARQ/FEC algorithm.

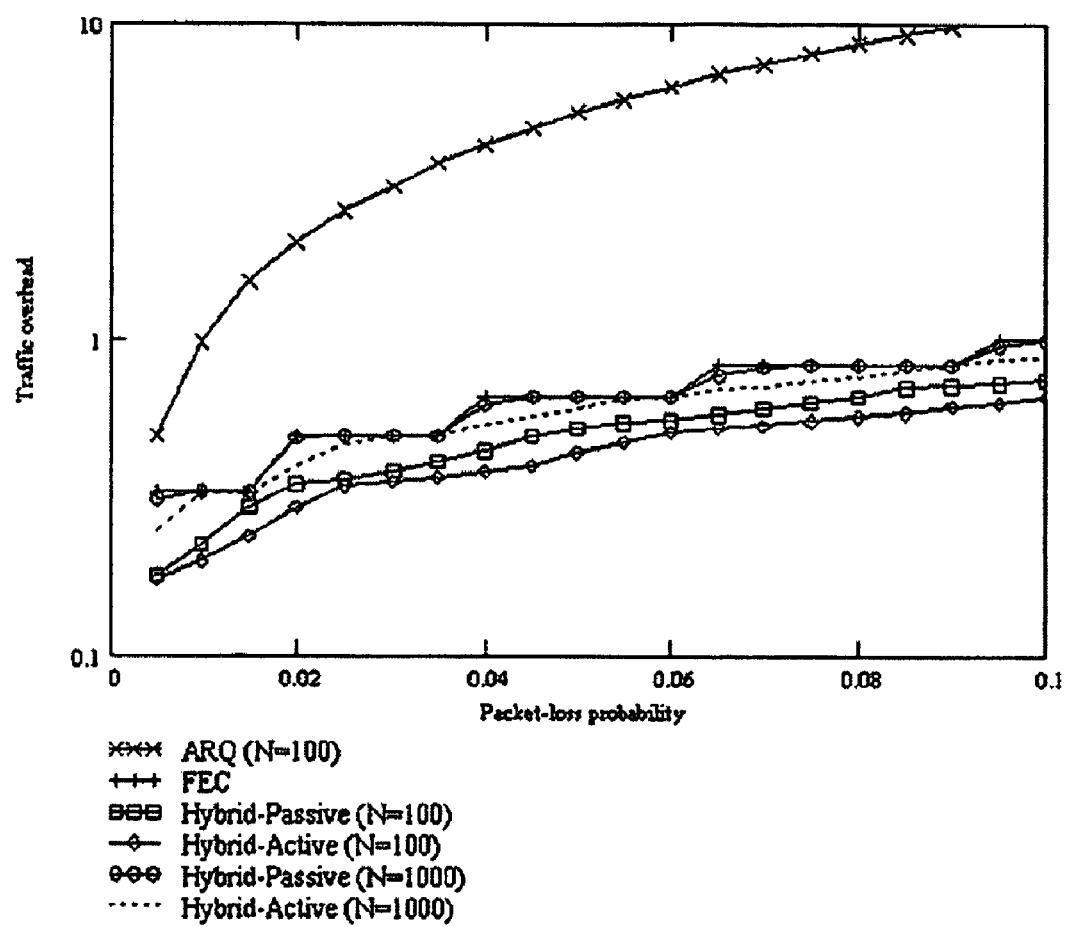
Fig. 7. Traffic overhead versus packet-loss probability.

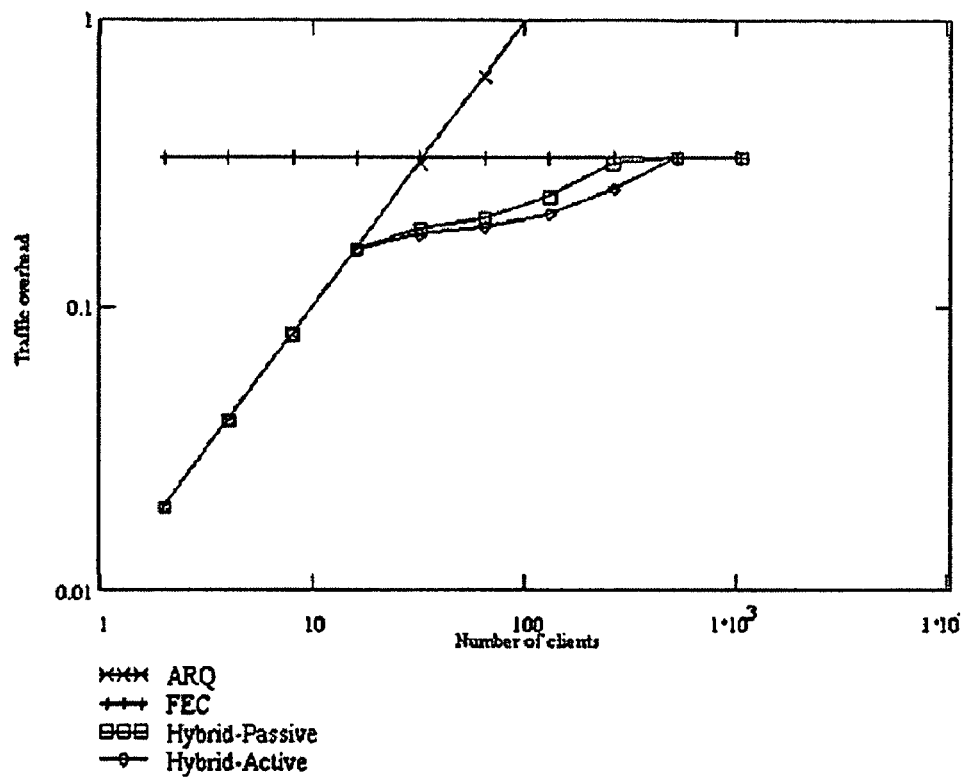
Fig. 8. Traffic overhead versus number of receivers (packet-loss probability is 0.01).

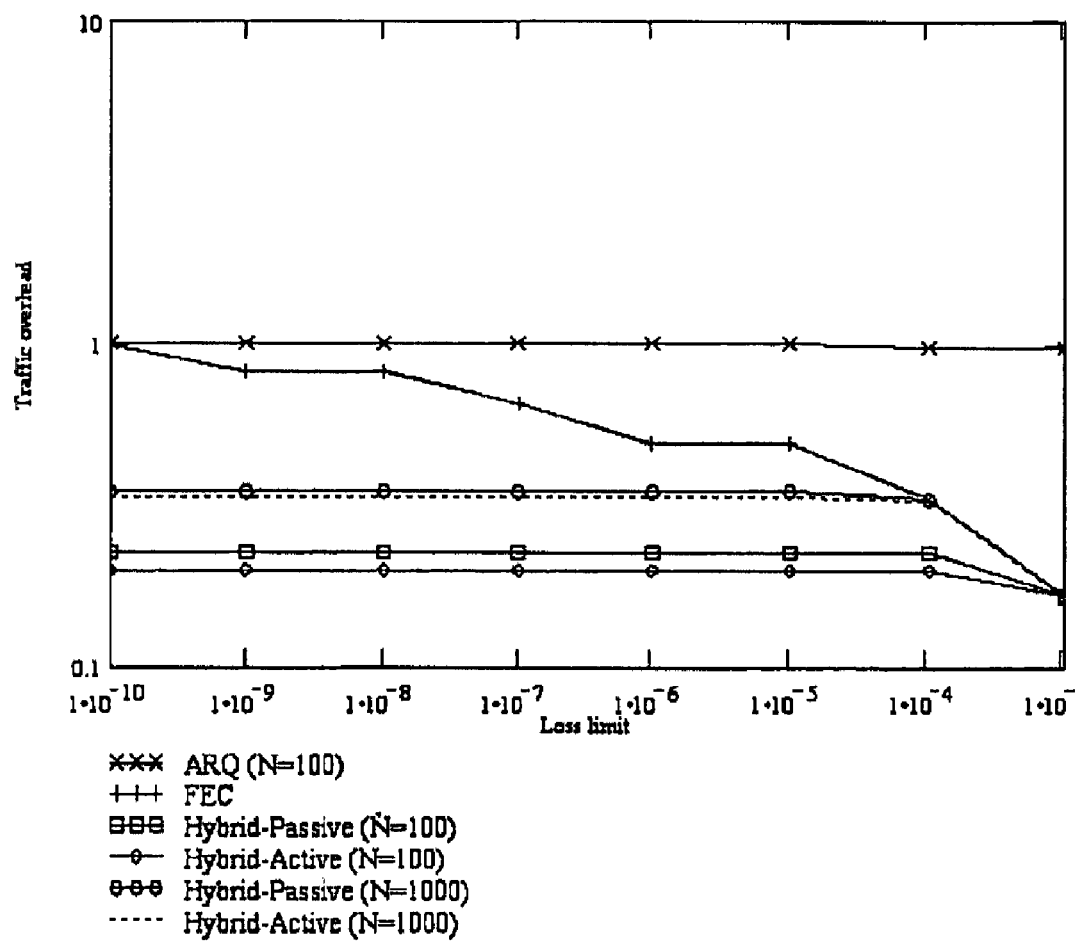
Fig. 9. Traffic overhead versus loss limit.

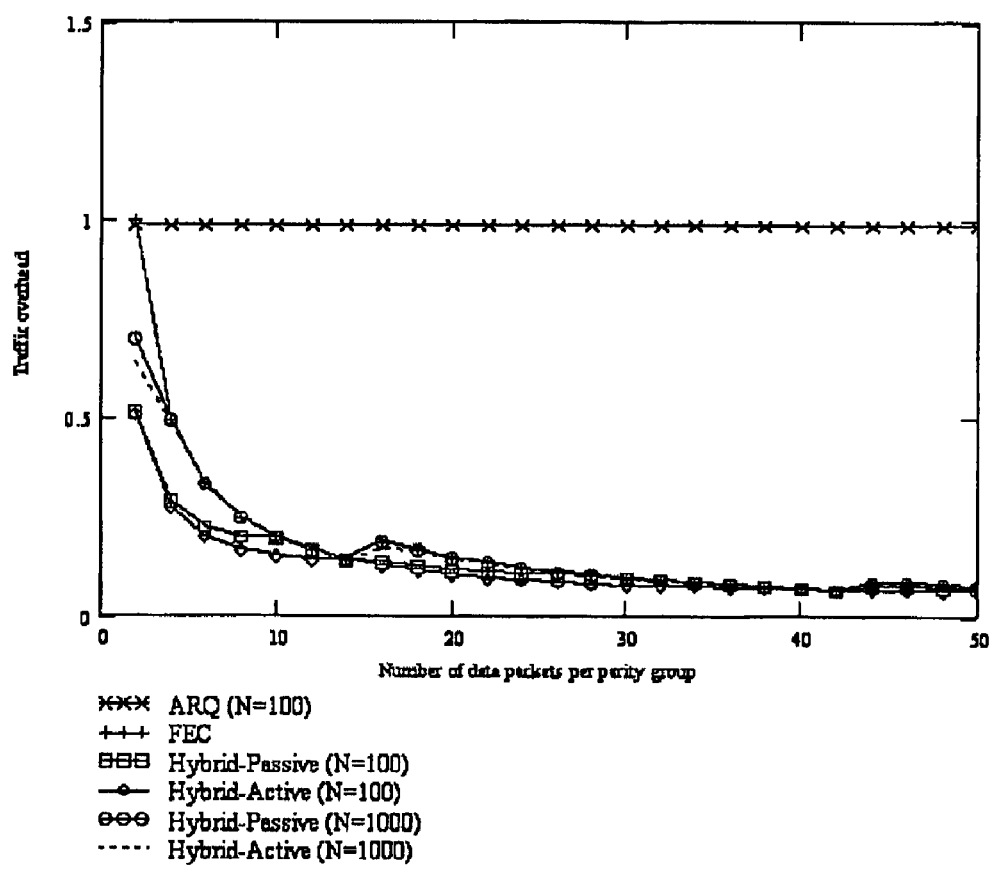
Fig. 10. Traffic overhead versus parity group size.

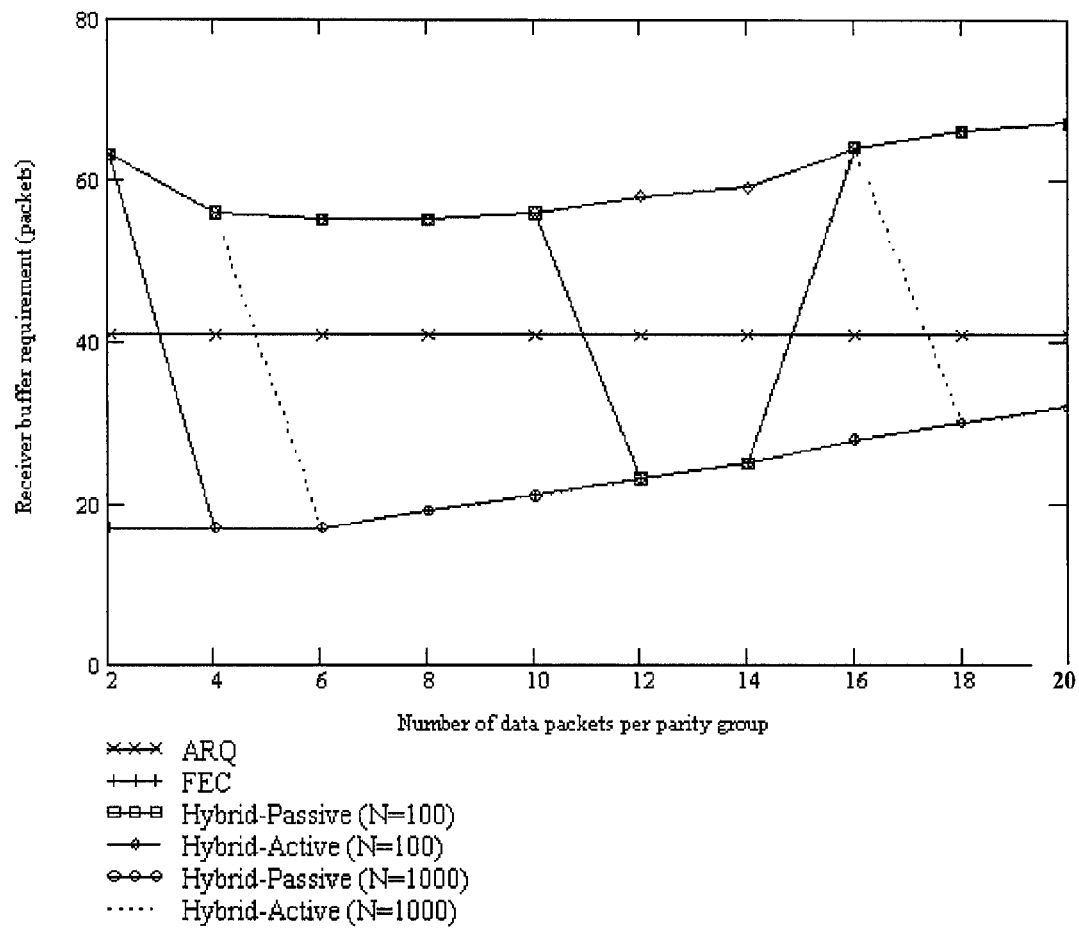
Fig. 11. Receiver buffer requirement versus parity group size

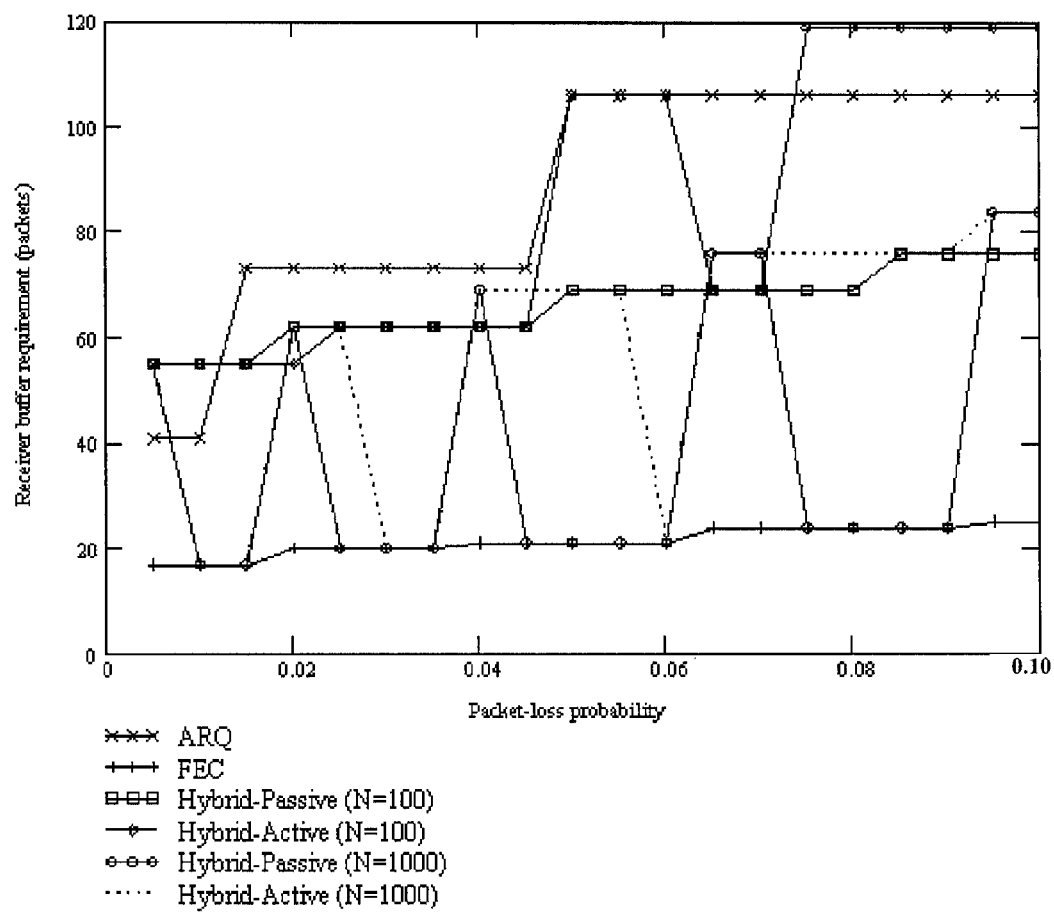
Fig. 12. Receiver buffer requirement versus packet-loss probability

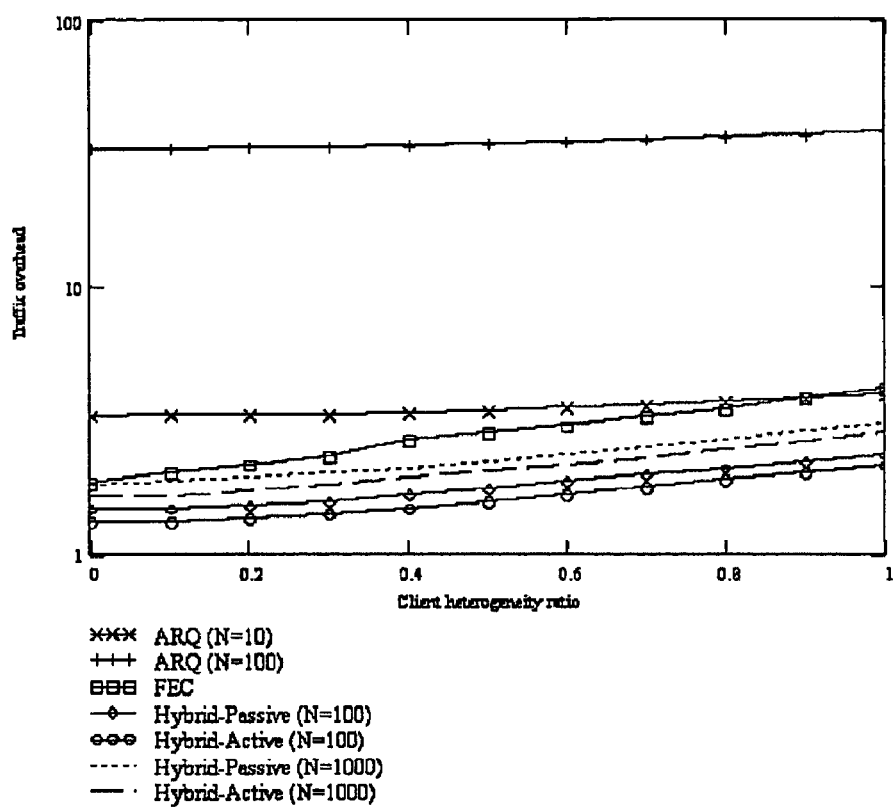
Fig. 13. Traffic overhead versus heterogeneous packet-loss probabilities.

ERROR CONTROL IN MULTICAST VIDEO DISTRIBUTION

CROSS REFERENCE TO RELATED APPLICATIONS

The present patent application is a continuation of U.S. patent application Ser. No. 09/945,345 filed on Aug. 30, 2001 now U.S. Pat No. 7,224,702 and entitled "SYSTEM AND METHOD FOR ERROR-CONTROL FOR MULTICAST VIDEO DISTRIBUTION" which claims the benefit of priority from commonly-owned U.S. Provisional Patent Application No. 60/228,772, filed on Aug. 30, 2000, entitled "Error-Control Method for Multicast Video Distribution."

The entire disclosures of above referenced patent applications are incorporated by reference as part of the specification of this application.

BACKGROUND

The present invention relates to networking. The present invention is especially applicable to controlling errors in the providing of content to multiple users, especially video content across broadband digital networks, especially residential broadband networks, such as cable or satellite TV networks.

With the slow but steady deployment of broadband residential networks, delivering high-quality digital video to a large number of simultaneous users becomes feasible. Examples include interactive video-on-demand and digital video multicasting or broadcasting. To compete with the conventional video delivery media (e.g. VCR tapes, LD, and DVD), these services not only have to be cost-effective and convenient, but also have to achieve competitive video quality.

Unlike the Internet, which is an extremely error-prone environment with little or no performance guarantees, broadband residential networks generally have higher bandwidth, lower latency, lower loss, and the performance is relatively stable. Nonetheless, occasional data losses in such networks are inevitable and would certainly result in video-quality degradations at the receiver end. While it is generally acceptable to receive lower-quality video over the Internet, consumers would be much less tolerant of degradation of video delivered over broadband residential networks where high-quality video is the norm (e.g. TV broadcast and cable TV) rather than the exception.

The general problem of error control is not new and has been studied extensively over more than two decades. Traditionally, there are two major classes of error-control algorithms: retransmission-based algorithms, commonly known as Automatic Repeat Request (ARQ), and redundancy-based algorithms, commonly known as Forward Error Correction (FEC). In ARQ, lost packets are transmitted repeatedly until correctly received by the receiver. In FEC, additional redundant data are injected into the data stream so that errors or erasures can be corrected at the receiver.

SUMMARY OF INVENTION

What is needed is a system and a method for controlling errors that is specifically optimized and well suited to use in applications such as multicast video distribution over broadband residential networks and the like.

Some embodiments of the present invention include an efficient error-control system and method for recovering packet losses, especially losses in distributing multicast video over broadband residential networks. The system and method integrates two existing classes of error-control algorithms: Automatic Repeat Request (ARQ) and Forward Error Correction (FEC), to reduce traffic overhead and achieve scalability. Preferably, unlike most existing error-control algorithms designed for Internet multicast, the system and method does not employ substantial feedback suppression. Preferably, the system and method does not employ substantial multicasted retransmission. Preferably, the system and method does not employ substantial parity retransmission. Preferably, the system and method does not employ substantial local loss recovery.

BRIEF DESCRIPTION OF THE DRAWINGS

FIG. 3 shows a worst-case retransmission scenario for the ARQ algorithm.

FIG. 4 illustrates a relation between the virtual playback and the original playback schedule.

FIG. 5 illustrates a worst-case retransmission scenario for the passive recovery mode of the hybrid ARQ/FEC algorithm.

FIG. 6 illustrates a worst-case retransmission scenario for the active recovery mode of the hybrid ARQ/FEC algorithm.

FIG. 7 shows traffic overhead at the server link versus packet-loss probability.

FIG. 8 shows the traffic overhead versus the number of receivers in the multicast session.

FIG. 9 shows the traffic overhead versus the loss limit tolerable by the media.

FIG. 10 shows the traffic overhead for parity group sizes ranging from 2 to 50.

FIG. 11 shows receiver buffer requirement versus parity group size.

FIG. 12 shows receiver buffer requirement versus packet-loss probability.

FIG. 13 shows traffic overhead versus heterogeneous packet-loss probabilities.

DETAILED DESCRIPTION

Figure 1:
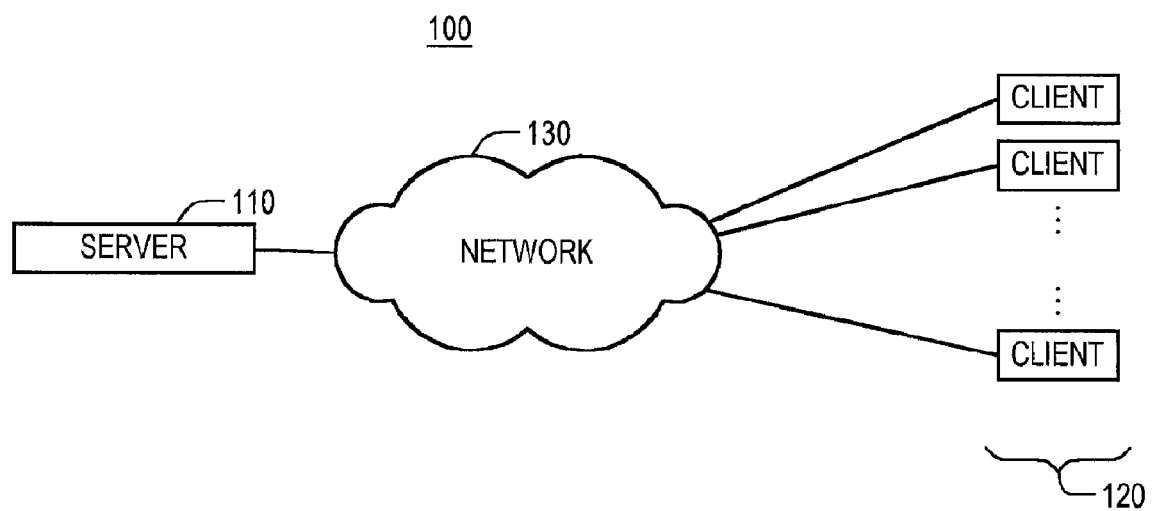
FIG. 1 is a schematic block diagram of a broadband system that includes a server and clients coupled by a network and can be used to implement the error correction techniques described in this application.

The description above and below and the drawings of the present document focus on one or more currently preferred embodiment(s) of the present invention and also describe some exemplary optional features and/or alternative embodiments. The description and drawings are for the purpose of illustration and not limitation. Section titles below are terse and are for convenience only.

I. First Overview: ARQ and FEC

In most applications, ARQ algorithms are more bandwidth efficient than FEC algorithms. Assuming the use of receiver-initiated selective-repeat ARQ, additional traffic overhead is incurred only when there are packet losses whereas constant traffic overhead is incurred in FEC. However, this is true only when the application is unicast-based or the number of concurrent users is small. In particular, ARQ algorithms are well known to suffer from the request-implosion problem in the context of multicast data distribution if the user population is large. This is because retransmission is performed for each receiver independently, and hence the amount of traffic overhead incurred in retransmission is proportional to the number of receivers in the multicast session. As a video server only has finite transmission (including retransmission) capacity, it will eventually be overloaded by the traffic overhead when the number of receivers grows beyond the capacity limit. While ARQ performs better for small user populations, FEC scales better for large user populations. In particular, the traffic overhead incurred in FEC is independent of the number of users in the multicast session, provided that all users have similar parameters (e.g. packet-loss probability). In short, ARQ algorithms are more bandwidth efficient for small user populations while FEC algorithms are more bandwidth efficient for large user populations.

According to an embodiment of the present invention, a hybrid system and method integrates ARQ and FEC to combine the strengths of both algorithms. The hybrid system and method are for recovering packet losses in multicast-video distribution applications. The hybrid system and method can operate in two configurations, namely passive recovery mode and active recovery mode. The hybrid system and method can be described by performance metrics including traffic overhead, receiver buffer requirement, and server buffer requirement. These methods can be computed for the hybrid system and method, as well as for ARQ and FEC using analytical models. Using numerical results computed over a wide range of parameters, it is shown that the hybrid system and method have significant performance advantages when compared to ARQ and FEC.

II. Second Overview: Other Specific Approaches

The hybrid system and method have advantages over other specific approaches to error control, which are discussed below in this section. In general, embodiments of the hybrid system and method exist without regard to these other specific approaches. However, according to a particular set of embodiments of the hybrid system, for each such other specific approach discussed below in this section, the hybrid system and method (i) preferably does not perform or include the each such other specific approach and (ii) preferably does not perform or include any element or step of the such other specific approach, if that element or step is not specifically needed in the hybrid system. According to another embodiment of the present invention, the hybrid system and method (i) preferably does not perform or include any of the other specific approaches discussed below in this section and (ii) preferably does not perform or include any element or step of any of the other specific approaches discussed below in this section, if that element or step is not specifically needed in the hybrid system.

The problem of error recovery for multicast transmission has been studied by many researchers. Carle and Biersack [1] have done an extensive survey of error-recovery techniques for IP-based audio-visual multicast applications, covering both error recovery and error concealment techniques. Most of the studies employ ARQ for error control and use some form of feedback suppression and/or local recovery to reduce bandwidth overhead in scaling the system to a large number of receivers. For example, the studies by Floyd et al. [2] used multicast to send retransmission requests so that other receivers can suppress duplicate requests to reduce overhead. Lin et al. [3] proposed a technique called ACK fusion where receivers are organized into a hierarchy. Duplicate acknowledgements (ACKs) can then be combined (fused) before passing up the hierarchy. These approaches indeed can reduce the amount of upstream traffic going from the receivers to the sender but at the expense of additional delay. This is undesirable for multicast video distribution as video has stringent playback deadlines. If one cater for the worst-case delay under such feedback-suppression algorithms, the additional delay incurred could lead to very large receiver buffer requirement and long response time.

Rather than simply suppressing duplicate feedback requests, Xu, et al. [4] went a step further to propose the use of local loss recovery to achieve better scalability. Specifically, receivers in a multicast session are again organized into a hierarchy such that each receiver has one or more parent nodes. A receiver sends requests to a parent node rather than the source for retransmission. If the parent node happens to have correctly received the required packets, then it could retransmit those packets to the receiver directly. Otherwise, the parent node might seek retransmission from a higher-layer parent node, and so on until the lost packets are retransmitted. Similar hierarchical schemes with local loss recovery have also been studied by Papadopoulos et al. [5], Costello [6] and Lucas et al. [7]. This local-recovery approach is particularly attractive in Internet data delivery due to the long and varying delay between the sender and the receivers.

The main disadvantage of this local-recovery approach is the need for other receivers to participate in recovering lost packets for a certain receiver. In particular, a management protocol is needed for the system to select some receivers to act as retransmission agents and others as passive receivers. Hence, the performance of the protocol is likely to be affected if receivers frequently join and leave a multicast session. Moreover, while the protocol works well in large multicast groups, it may not work well if the multicast group is small because local recovery will be less effective. On the contrary, the hybrid algorithms studied in this paper works well for multicast groups of all sizes. Furthermore, error-control is served by the source rather than by other receivers, hence reducing the complexity of the receivers as well as the need to adapt to membership changes in the multicast session. For example, if a user abruptly shuts down a receiver (e.g. disconnecting power) that happens to be a parent node, then the dependent receivers would loose their loss-recovery support.

In another study by Nonnenmacher et al. [8], they studied the combination of FEC with ARQ for error-recovery in data multicast applications. In particular, they considered two approaches in combining FEC and ARQ: layered FEC and integrated FEC. The first approach is similar to the passive recovery mode in our hybrid algorithm. The second approach, called integrated FEC, retransmits redundant packets computed across multiple packets in place of the lost packet. In this way, the same retransmitted redundant packet can be used to recover different lost packets within the same parity group. They showed that their hybrid algorithm performs better than FEC. As this study focused on the delivery of discrete-media rather than continuous-media like audio and video, they did not consider the issue of media playback continuity nor receiver buffering with respect to the proposed error-recovery algorithms.

A similar approach has also been studied by Rubenstein et al. [9]. Their proactive forward error correction algorithm also sends redundant packets in addition to normal data packets. However, during retransmission they allow the receiver to request transmission of more-than-necessary redundant packets so that future retransmission attempts can be avoided. As proactive FEC is designed for real-time multicast over the Internet, it incorporates sophisticated algorithms to adapt the protocol to varying network conditions. By contrast, this paper focuses on multicast video distribution over broadband residential network environments. In particular, the more predictable network environment enables us to derive a performance model for the proposed hybrid ARQ/FEC algorithm that incorporates not only the network model, but also the video playback process at the receiver as well.

In the study by Pejhan et al. [10], they proposed the use of multicast in sending feedback requests for negative acknowledgements (NACKs) from receivers to a server so that the receivers can learn of each other's NACKs to apply feedback-suppression schemes to reduce duplicate NACKs. Their results showed that multicasting requests can improve performance if the receivers are locally concentrated. Otherwise, the overhead in delivering multicast request packets to far-apart receivers can incur significant overhead in the network. In our hybrid algorithms, we use unicast to deliver request packets directly from receivers to the server and hence do not require the receivers to be locally concentrated. As shown in Section VIII, the integration of FEC with ARQ already substantially reduced the need for retransmission.

A different approach called Layered Video Multicast with Retransmission (LVMR) has been proposed by Li et al. [11]. In LVMR, a video stream is divided into layers and then multicasted on independent channels. A receiver can combine multiple layers to yield different levels of video quality. Receivers are organized into a hierarchy to reduce error-control overhead at the source and retransmissions are multicasted to further reduce duplicate requests. The distinctive feature of LVMR is its ability to adapt to changing network conditions by adding layers to or dropping layers from the current video session. This study differs from the hybrid algorithms studied in this paper in two major ways: Firstly, this protocol requires support from the video codec. In particular, the video codec must support layered encoding. Hybrid ARQ/FEC on the other hand, can work with any video codec. It is even possible to apply hybrid ARQ/FEC to individual channels of the layered video transmissions. Secondly, the need to maintain a hierarchical organization among receivers in LVMR also poses robustness problems when receivers join, leave, or even crash during the course of a multicast session. This problem does not exist in hybrid ARQ/FEC as communications between the source and the receivers are direct.

III. HYBRID ERROR-CONTROL ALGORITHM

In this section, we present the hybrid error-control system and methodology according to an embodiment of the present invention and explain two variants of the methodology.

FIG. 1 is a schematic block diagram that shows a broadband system 100, that when programmed or configured as discussed herein, is an embodiment of the present invention. The system 100 includes a server 110 and clients 120 coupled by a network 130, which is preferably a residential broadband network.

For the purpose of explanation and understanding, for distributing video using multicast, we assume that the video server transmits multicast video packets of size $Q_S$ bytes periodically with a period of $T_S$ seconds. In addition to normal video packets, the server also generates R redundant packets for every D video packets. These (R+D) packets then form a parity group. For the special case of R equal to one, the redundant packet can simply be computed from the exclusive—or among the D video packets. For R larger than one, more sophisticated channel coding scheme such as Reed-Solomon codes can be used. With these R redundant packets in place, the receiver can always reconstruct all D video packets as long as any D out of these (R+D) packets are correctly received. In other words, the parity group can tolerate up to R packet losses.

If there are more lost packets than can be recovered using erasure correction alone, then the receiver will request retransmission from the server. As broadband residential networks have relatively low loss rate, we can assume that packet losses among different receivers are uncorrelated. Hence, retransmission request (i.e. NACK) and reply are both sent using unicast instead of multicast. Multicasting retransmission requests and replies are more effective for networks with higher loss rate and correlated packet losses (e.g. Internet) [8-10].

With redundant packets in the video stream, the receiver can recover lost packets by erasure correction in addition to using retransmission. In particular, the receiver can either attempt to recover lost packets first by erasure correction and then by retransmission—passive recovery; or first by retransmission and then by erasure correction—active recovery.

A. Passive Recovery

Figure 2A:
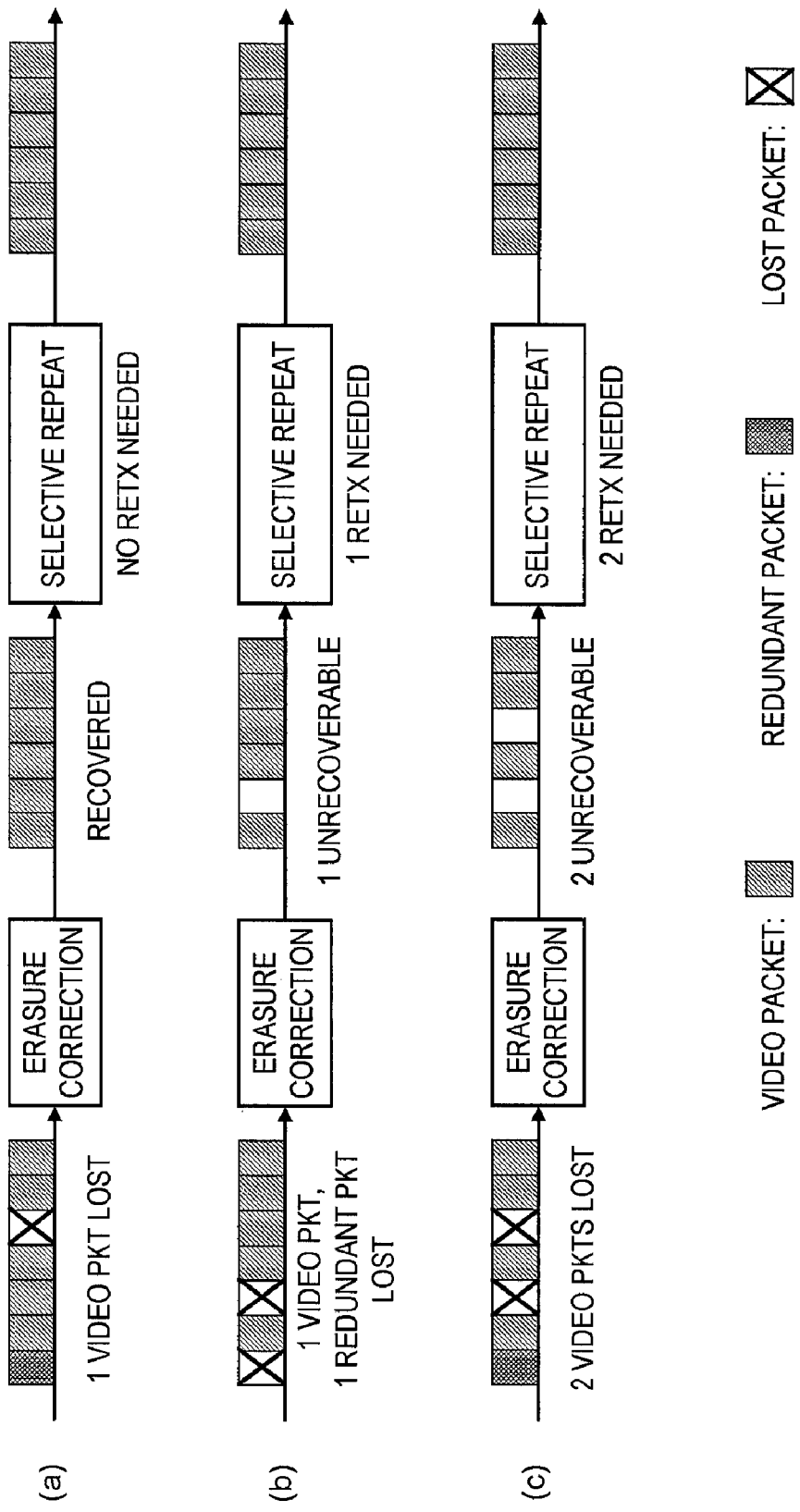
FIG. 2A illustrates an implementation of the passive recovery mode of the hybrid ARQ/FEC algorithm.

In passive recovery as depicted in FIG. 2A, the receiver attempts to recover lost packets first by erasure correction using a conventional redundancy recovery algorithm. With a redundancy of R, the receiver can recover up to R lost packets without retransmission (FIG. 2A($a$)). After attempting such erasure correction, if any lost packet(s) is still not recovered, then the receiver will send a request back to the server to retransmit the lost packet(s) (i.e. NACK with selective repeat). The example in FIG. 2A($b$) has one lost video packet and one lost redundant packet in a parity group. Note that only the lost video packet needs to be retransmitted because the lost redundant packet will be removed by the erasure correction process and is thereafter no longer considered missing. On the other hand, if two video packets are lost in a parity group as shown in FIG. 2A(c), both lost packets will be requested to be retransmitted.

B. Active Recovery

Figure 2B:
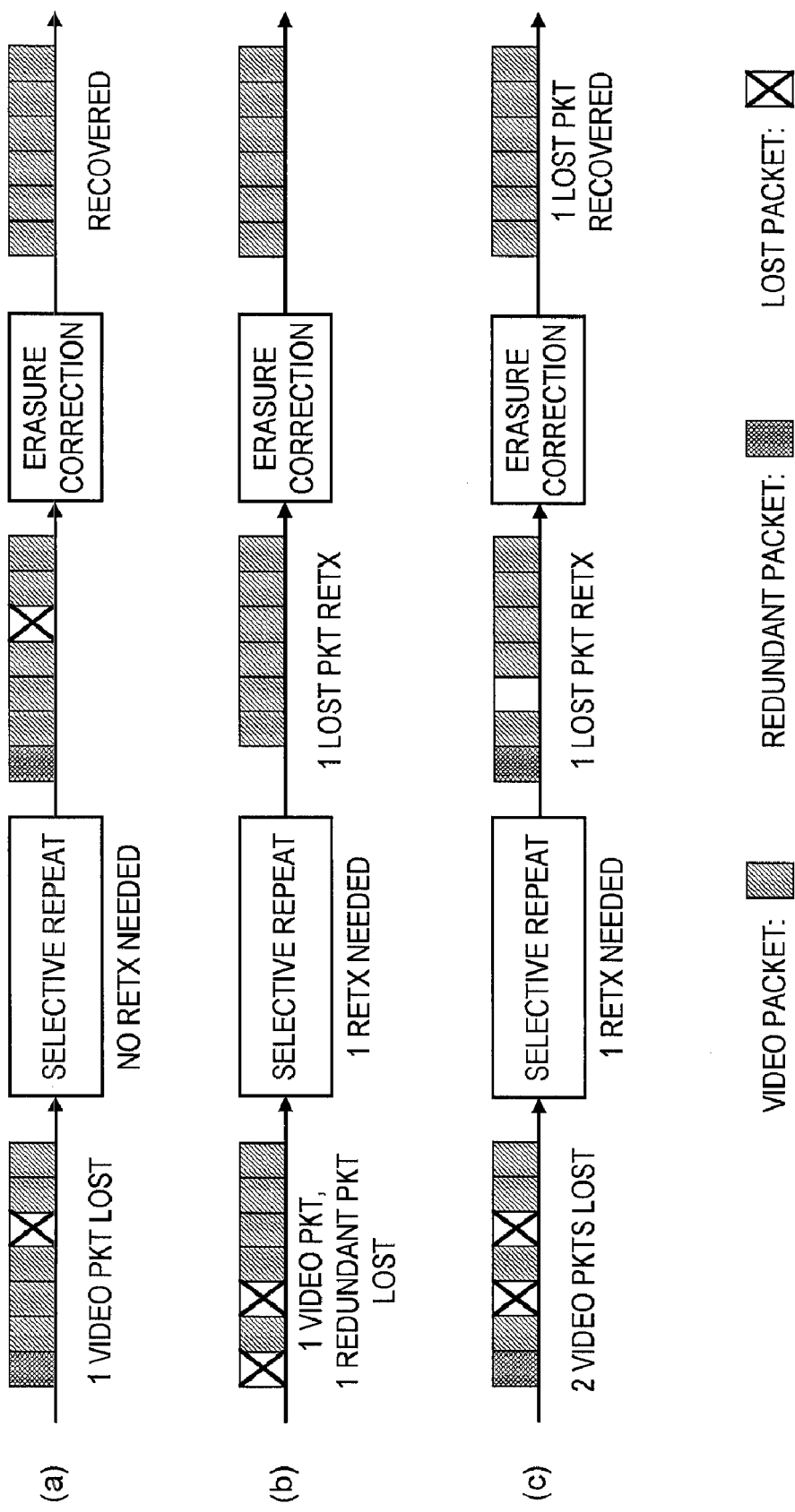
FIG. 2B illustrates an implementation of the active recovery mode of the hybrid ARQ/FEC algorithm.

A shortcoming of the passive recovery mode is that correctly-received redundant packets may not be fully utilized in recovering lost packets. For example, the redundant packet in FIG. 2A($c$) is not used in erasure correction (because it cannot be done due to too many losses) but is simply discarded. To eliminate this inefficiency, we reverse the order of erasure correction and retransmission as depicted in FIG. 2B which shows the same example inputs as did FIG. 2A. Now with a redundancy of R, the receiver does not request retransmissions for all lost packets. In particular, only a subset of the lost packets are requested. The subset is the minimum subset that, after successful retransmission, would still leave exactly R lost packets (including the redundant packets). For example, as long as no more than R packets are lost in the parity group, all video packets can already be recovered by erasure correction (see FIG. 2B($c$), which corresponds to the input of FIG. 2A($c$)) and thus no retransmission is requested at all.

Unlike passive recovery, active recovery fully utilizes all received video and redundant packets for lost-packet recovery.

However, active recovery does have its own problem: the total number of lost packets is not known until the whole parity group is received. Hence, if the receiver initiates retransmission before the entire parity group has arrived, some retransmitted packets may be unnecessary if it turns out fewer than R packets are lost in this parity group. This defeats the purpose of introducing redundant packets in the first place. Therefore, the receiver defers retransmission until the whole parity group has arrived. On the other hand, for example, if there are exactly M (where M>R) packets lost in a parity group, only (M−R) of the M lost packets need to be retransmitted. Retransmission can start as soon as the receiver detects the loss of the (R+1)"th packet without waiting for the whole parity group to arrive; the receiver will request retransmission for the last (M−R) of the lost packets.

We have derived the performance metrics for both approaches. These metrics and numerical comparisons thereof are found in the incorporated-by-reference U.S. Provisional Patent Application No. 60/228,772. The results show that the hybrid methodology outperforms both ARQ and FEC significantly in terms of traffic overhead incurred in error recovery. Moreover, with an acceptable amount of buffering at the receiver, video playback continuity can also be guaranteed despite packet losses.

Thus, in the passive recovery mode, lost packets are first recovered by erasure correction and then by retransmission. In the active recovery mode, lost packets are retransmitted as necessary until all video packets can be recovered by erasure correction afterward.

The following sections describe additional technical features of the error control in video distribution that combines both the ARQ and FEC error correction techniques.

Performance Modeling

Existing studies on Internet video delivery usually use overall traffic overhead in the entire multicast tree as a metric for performance evaluation. This is motivated by the fact that the Internet is known to have limited bandwidth and hence protocols that can minimize overall traffic overhead are highly desirable. By contrast, overall traffic overhead is less important in broadband residential network environments as the local or regional residential networks usually have relatively large bandwidth. The bottleneck is likely to be the trunk that connects the regional cluster with the central video server. This motivates us to consider traffic overhead at the server-side network connection instead of over the entire multicast tree.

We define traffic overhead as the ratio between network traffic at the server link incurred in error recovery and the network traffic for normal video delivery. A traffic overhead of 0.1 means 10% additional network traffic incurred for the recovery of lost packets. Since the server link has only finite network bandwidth, too many traffic overheads will limit the scalability of the system. For simplicity, we ignore traffic overhead incurred by control packets such as NACK in the uplink from receivers to servers. This assumption is justified by the fact that retransmission requests are much smaller than retransmitted video packets. Hence, the downlink traffic volume will dominate the uplink traffic.

Unlike Internet video distribution where the receivers are often conventional computers with lots of memory, set-top boxes with limited memory are usually used in residential applications. Therefore we use receiver buffer requirement as the second metric for performance evaluation. Since video data is a continuous-media that must be presented at a predetermined rate, memory buffers are needed at the receiver to absorb delay and delay jitters incurred in video packet delivery. If no data is available for playback due to network delay or packet loss, video playback will be stalled—also known as playback starvation. On the other hand, if too many packets arrive at a receiver too early, receiver buffer overflow will occur and likely results in packet dropping. Since a receiver must prefill some of its buffers before playback starts, a startup delay is incurred whenever a receiver joins a video multicast session. As this startup delay directly affects system responsiveness, the receiver buffer requirement should not be too large even if memory is abundant.

Let there be N receivers in a multicast session and let $p_i$ ($0 \leq i \leq N$) be the probability of packet loss experienced by receiver i. To model network delay, we let $T_i$ be the average network delay, and $T_i^+$ ($T_i^+ \geq 0$), $T_i^-$ ($T_i^- \leq 0$) be the maximum delay jitters between receiver i and the server. Hence, the network delay experienced by a packet must be within ($T_i + T_i^+$) and ($T_i + T_i^-$). The delay and delay jitters can be obtained a priori if the network have quality-of-service support.

At the receiver, let $p_{max}$ be the maximum tolerable packet-loss probability for the media (video). We will use the term loss limit to refer to $p_{max}$ in the rest of the paper. At the server, video packets of size $Q_S$ bytes are periodically multicasted with a period of $T_S$ seconds. Hence, if the video bit-rate is $R_v$ bytes-per-second (Bps), then $T_S = Q_S/R_v$. Let $T_{tran}$ be the transmission time for a video packet, i.e. the time for sending the entire video packet from the server memory onto the server-side network, with $T_{tran} < T_S$. Let $T_{start}$ be the time the server multicasts the first video packet for the multicast session. Then incorporating network delay, delay jitters, and transmission time, the arrival time at receiver i packet j (j=0, 1, 2 ...) denoted by $A_i^j$ is bounded by $$\max\{T_{start}+T_{tran}+jT_S+T_i+T_i^-, T_{start}\} \leq A_i^j \leq T_{start}+T_{tran}+jT_S+T_i+T_i^+ \quad (1)$$

Note that we need the maximization because $T_i \leq 0$. Knowing the above bounds, we can derive the performance metrics for ARQ, FEC, and the proposed hybrid algorithm in the following sections.

Analysis of Automatic Repeat Request (ARQ)

A. Traffic Overhead

Assume that packet losses are independent and with loss probability $p_i$, then the residual loss probability—the probability of an unrecoverable packet loss, after $K_i$ transmission attempts is simply given by $p_i^{K_i}$. To maintain video playback quality, we need to choose $K_i$ such that the loss limit is not exceeded:

$$p_i^{K_i} \leq p_{max} \quad (2)$$

Rearranging, we can then obtain $K_i$ from $$K_i \geq \left\lceil \frac{\ln p_{max}}{\ln p_i} \right\rceil \quad (3)$$

Given $K_i$, the expected number of transmissions for each video packet can be obtained from $$\sum_{j=1}^{K_i} j(p_i^{j-1}(1-p_i)) \quad (4)$$

Hence, the ratio of extra traffic overhead incurred (excluding the first transmission) in retransmission for receiver i is given by $$h_i = \frac{\text{traffic for retransmission}}{\text{traffic for data}} = \frac{\sum_{j=1}^{K_i}(j-1)(p_i^{j-i}(1-p_i))}{1} \quad (5)$$

Finally, the traffic overhead at the server link is just the sum of traffic overhead for all receivers:

$$H_{ARQ} = \sum_{i=0}^{N-1} h_i \qquad (6)$$

B. Receiver Buffer Requirement

To determine the receiver buffer requirement, we let $L_{ARQ}(i)=Y_i+Z_i$ be the number of buffers (each $Q_S$ bytes) in receiver i, managed as a circular buffer. The receiver starts playback once $Y_i$ buffers are filled with video data. These $Y_i$ prefetched buffers are then used to absorb delay variations in packet arrivals to prevent video playback starvation (i.e. buffer underflow). On the other hand, we reserve $Z_i$ empty buffers to cater for early-arrival packets to prevent buffer overflow.

Under this model, video playback effectively starts at time $A_i^{Y_i-1}$, which is the time video packet $(Y_i-1)$ arrives at receiver i. Hence, the playback time for video packet j of receiver i is $$P_i^j = A_i^{Y_i-1} + jT_S \qquad (7)$$

For simplicity, we assumed a constant playback time ($T_S$) for all video packets. This simplification can be removed to incorporate variable (but bounded) playback time or even variable-bit-rate video playback using techniques in [12].

To maintain video playback continuity, we must ensure that all video packets arrive before playback deadline. Formally, the arrival time for a video packet must be earlier than this playback time:

$$A_i^j \leq P_i^j \forall j \qquad (8)$$

Substituting the upper bound for $A_i^j$ and the lower bound for $P_i^j$ into (8), we can then obtain the condition for continuity as $$\max\{A_i^j\} \leq \min\{P_i^j\} \qquad (9)$$

$$T_{start} + T_{tran} + jT_S + T_i^- + T_i^+ \leq \min\{A_i^{Y_i-1} + jT_S\}$$

$$= \min\{A_i^{Y_i-1}\} + jT_S$$

$$= T_{start} + T_{tran} + (Y_i - 1)T_S +$$

$$T_i^- + T_i^+ + jT_S$$

Rearranging we can obtain $Y_i$ from $$Y_i \geq \frac{T_i^+ - T_i^-}{T_S} + 1 \qquad (10)$$

Similarly, to prevent buffer overflow, we need to ensure that an empty buffer is always available when a new video packet arrives. As the receiver buffers are managed as a circular buffer, we need to ensure that $$\min\{A_i^{j+Y_i+Z_i-1}\} \geq \max\{P_i^j + T_S\} T_{start} + T_{tran} + (j+Y_i+Z_i-1)T_S + T_i T_i^- \geq T_{start} + T_{tran} + (j+Y_i)T_S + T_i + T_i^+ \qquad (11)$$

Rearranging, we can then obtain $Z_i$:

$$Z_i \geq \frac{T_i^+ - T_i^-}{T_S} + 1 \qquad (12)$$

Hence, the total number of receiver buffers needed for receiver i is:

$$L_{ARQ}(i) = 2\left\lceil \frac{(T_i^+ - T_i^-)}{T_S} \right\rceil + 2 \qquad (13)$$

To incorporate the effect of retransmission, we note that each retransmission attempt incurs a maximum additional delay of $T_{tran}+T_{wait}+T_i+T_i^+$, where $T_{wait}$ is the retransmission timeout (FIG. 3). Since at most $K_i$ transmissions (including retransmissions) are attempted for delivering a video packet, the upper bound for the arrival time of packet j of receiver i is modified to $$A_i^j \leq (T_{start}+T_{tran}+jT_S+T_i+T_i^+)+(K_i-1)(T_{tran}+T_{wait}+T_i+T_i^+) \qquad (14)$$

where the first term is the worst-case delay incurred in the first transmission and the second term is the worst-case delay incurred in the next $(K_i-1)$ retransmissions.

Again, let there be $L_{ARQ}(i)=Y_i+Z_i$ receiver buffers, and playback starts after $Y_i$ buffers are filled with video data. Now as the packet-loss probability is non-zero, it is possible that some of those first $Y_i$ packets are lost and requires retransmissions. In particular, if video packet $(Y_i=1)$ is lost, the prefetch process (and hence playback) will be delayed. To avoid unnecessary delay, the receiver starts playback when the expected arrival time for packet (prefetch process (and hence playback) will be delayed. To avoid unnecessary delay, the receiver starts playback when the expected arrival time for packet $(Y_i-1)$ $$P_i^0 = A_i^0 + (Y_i-1)T_S \qquad (15)$$

is reached, regardless of whether the packet has physically arrived or not (i.e. due to loss or delay jitter). Hence in general, we have $$P_i^j = A_i^0 + (Y_i+j-1)T_S \qquad (16)$$

Using the continuity condition, we can obtain $Y_i$ from $$\max\{A_i^j\} \leq \min\{P_i^j\} \qquad (17)$$

$$T_{start} + T_{tran} + jT_S + T_i + T_i^+ + (K_i - 1)(T_{tran} + T_{wait} + T_i + T_i^+) \leq \min\{A_i^0 + (Y_i + j - 1)T_S\}$$

$$= T_{start} + T_{tran} + T_i +$$

$$T_i^- + (Y_i + j - 1)T_S$$

Rearranging, we then have:

$$Y_i \geq \frac{(K_i - 1)(T_{tran} + T_{wait} + T_i + T_i^+) + (T_i^+ - T_i^-)}{T_S} + 1 \qquad (18)$$

Compared to the case without packet loss (c.f. Eq. (10)), more buffers are needed to absorb the extra delay incurred in retransmissions.

Similarly, to prevent buffer overflow, we need to ensure that:

$$\max\{A_i^{j+Y_i+Z_i-1}\} \geq \max\{P_i^j + T_S\} \quad (19)$$

$$T_{start} + T_{tran} + \binom{j+Y_i+}{Z_i-1}T_S +$$
$$T_i + T_i^- \geq \max\{A_i^0 + (Y_i + j)T_S + T_i\}$$
$$= T_{start} + T_{tran} + T_i +$$
$$T_i^+ + (Y_i + j)T_S$$

Rearranging, we can then obtain $Z_i$ as well:

$$Z_i \geq \frac{(T_i^+ - T_i^-)}{T_S} + 1 \quad (20)$$

Note that $Z_i$ is the same as the case without packet loss in (12). This is because retransmissions make packets arrive only later but never earlier. Summing (18) and (20) we can then obtain the receiver buffer requirement for receiver i:

$$L_{ARQ}(i) = \quad (21)$$
$$\left\lceil \frac{(K_i - 1)(T_{tran} + T_{wait} + T_i + T_i^+) + (T_i^+ - T_i^-)}{T_S} \right\rceil + \left\lceil \frac{T_i^+ - T_i^-}{T_S} \right\rceil + 2$$

If the network delay and delay jitters are known a priori, then the retransmission timeout $T_{wait}$ can simply be set to equal to the maximum network delay $(T_i+T_i^+)$ and (21) can be simplified to $$L_{ARQ}(i) = \left\lceil \frac{(K_i - 1)(T_{tran} + 2(T_i + T_i^+)) + (T_i^+ - T_i^-)}{T_S} \right\rceil + \left\lceil \frac{T_i^+ - T_i^-}{T_S} \right\rceil + 2 \quad (22)$$

As an example, using the parametric values in Table 1, the buffer requirement as calculated from (22) will be 41 units. As each unit stores a packet of size 1024 bytes, total buffer requirement would be 41 KB.

Note that in practice, one would implement the receiver such that NACK is sent as soon as a gap in sequence number is detected. However, the time to detect such a gap depends on a number of parameters, namely packet size, video bit-rate, network delay jitter, and the extent of burst losses. Hence without resorting to specific parameter ranges, it would be difficult (if possible) to derive a general formula for the delay incurred in detecting a sequence-number gap. For special cases where gap-based detection delay is known to be shorter than the maximum network delay, one can simply replace $T_{wait}$ with the appropriate formula for more accurate results. For simplicity, we will assume $T_{wait}=(T_i+T_i^+)$ in the rest of the paper.

C. Server Buffer Requirement

At the server, buffers must be allocated to store outgoing video packets temporarily to support retransmissions. To determine the amount of additional buffer needed to support retransmission, we notice that the $n^{th}$(n=1, 2, ... $K_i$-1) NACK for a transmitted video packet will arrive at the server at most $$r_i^n \leq n(T_{tran}+T_{wait}+T_i+T_i^+) \quad (23)$$

seconds after the first transmission attempt (c.f. FIG. 3). Hence, the maximum buffer-occupation time for a video packet is simply given by $r_i^{K_i-1}$. Assuming that video packets for transmission are generated at the same rate as consumption, i.e. one packet per $T_S$ seconds, the number of video packets generated during this duration $r_i^{K_i-1}$ is then given by $$b_i = \left\lceil \frac{r_i^{K_i-1}}{T_S} \right\rceil \quad (24)$$

To cater for the requirements of all clients, the amount of buffer required for a server to support retransmission for one multicast video stream would then be the maximum among all clients:

$$B_{ARQ}=Q_S \max\{b_i|i=0,1,\ldots,(N-1)\} \quad (25)$$

VI. Analysis of Forward Error Correction (FEC)

In FEC, redundant data are introduced into the data stream in the form of redundant packets. Specifically, for every D video packets, R redundant packets are appended for transmission to the receivers. These R redundant packets are computed from the D video pockets using erasure-correction codes such as parity codes, or Reed-Solomon codes to form a parity group [13]. As R extra redundant packets are transmitted for every parity group, the packet inter-departure time at the server must be shortened to maintain the original video bit-rate. The new inter-departure time $\tilde{T}_S$ can be obtained from $$\tilde{T}_S = T_S \frac{D}{D+R} \quad (26)$$

Note that while the packet inter-departure time is shortened, the average rate at which video packets are transmitted remains the same. The extra transmissions are redundant packets computed from a parity group of video packets.

A. Traffic Overhead

With R redundant packets, a receiver can correctly recover all D all video packets as long as no more than R packets are lost within the same parity group. However, in the event that more than R packets are lost, a decoding error [13] will occur. In the worst case, all D video packets will be lost. Hence, the upper bound for the residual loss probability given by $$\varepsilon_i = \sum_{k=R+1}^{D+R} \binom{D+R}{k} p_i^k (1-p_i)^{R+D-k} \quad (27)$$

On the other hand, if the erasure-correction code employed is systematic, i.e. the D video packets are not modified during the encoding process, then the residual packet-loss probability will be smaller. Let there by k lost packets among the D video packets and R redundant packets. Then on average $$k\frac{D}{D+R} \quad (28)$$

Of the lost packets will be video packets. As there are D video packets, the resultant loss probability for video packets given there are k losses is simply equal to $$k \frac{D}{D+R} \cdot \frac{1}{D} = \frac{k}{D+R} \quad (29)$$

Hence, we can obtain the residual loss probability by conditioning on k:

$$\varepsilon_i = \sum_{k=R+1}^{D+R} \binom{D+R}{k} p_i^k (1-p_i)^{R+D-k} \frac{k}{D+R} \quad (30)$$

To maintain a residual loss probability of no more than $p_{max}$, we need a redundancy of at least $$R_{FEC} = \min\{R | \epsilon_i \leq p_{max}, \forall i\} \quad (31)$$

Using a redundancy of $R_{FEC}$, the traffic overhead at the server link can be obtained from $$H_{FEC} = \frac{R_{FEC}}{D} \quad (32)$$

Note that unlike ARQ, traffic overhead incurred by FEC is fixed irrespective of the number of receivers in the system.

B. Receiver Buffer Requirement

To determine the receiver buffer requirement, we again let $L_{FEC}(i) = Y_i + Z_i$ be the number of buffers (each $Q_S$ bytes) in receiver i and assume playback starts once $Y_i$ buffers are filled with video data. However, as some of the packets are redundant packets, these redundant packets are not "played back" in the usual sense. In particular, the redundant packets will be used for erasure correction if there are packet losses; or discarded otherwise. To account for this, we create a virtual playback schedule where the "playback" duration of a video packet or a redundant packet is $\tilde{T}_S$ rather than $T_S$ (FIG. 4). Under this virtual playback schedule where redundant packets are being consumed by the receiver just like normal video packets, all (except the first video packet in a parity group) video packets' playback deadlines are pushed forward and continuity in this new schedule implies continuity in the original schedule.

Formally, the video playback starts at time $A_i^{Y_i-1}$, which is the time video packet $(Y_i-1)$ arrives at receiver i. Hence the playback time for video packet j is $$P_i^j = A_i^{Y_i-1} - j\tilde{T}_S \quad (33)$$

To maintain video playback continuity, we must ensure that all video packets from a parity group arrive before the playback deadline of the first packet in the same parity group is reached[3]. For example, let packet j be the next packet for playback and it is lost in transit. In the worst case, this packet will be the first packet of a parity group and we need the entire group to recover it. Since packet $(j+R+D-1)$ would be the last packet in the parity group, we need to ensure that it arrives before the playback deadline for packet j:

$$A_i^{j+R+D-1} \leq P_i^j \forall j \quad (34)$$

Substituting the upper bound for $A_i^{j+R+D-1}$, and the lower bound for $P_i^j$ into (34) we can then obtain the condition for continuity as $$\max\{A_i^{j+R+D-1}\} \leq \min\{P_i^j\} \quad (35)$$

$$T_{start} + T_{tran}\binom{j+R+}{D-1}\tilde{T}_S + T_i + T_i^+ \leq \min\{A_i^{Y_i-1} + j\tilde{T}_S\}$$

$$= \min\{A_i^{Y_i-1}\} + j\tilde{T}_S$$

$$= T_{start} + T_{tran} + (Y_i - 1)\tilde{T}_S + T_i + T_i^- + j\tilde{T}_S$$

Rearranging gives the requirement for $Y_i$ as $$Y_i \geq \frac{(T_i^+ - T_i^-)}{\tilde{T}_S} + D + R \quad (36)$$

Similarly, we can obtain $Z_i$ using the same derivations as in Section V-B:

$$Z_i \geq \frac{(T_i^+ - T_i^-)}{\tilde{T}_S} + 1 \quad (37)$$

The total receiver buffer requirement for receiver i is just the sum of $Y_i$ and $Z_i$:

$$L_{FEC}(i) = 2\left\lceil \frac{(T_i^+ - T_i^-)}{\tilde{T}_S} \right\rceil + D + R + 1 \quad (38)$$

C. Server Buffer Requirement

Unlike ARQ, additional server buffers are not required to support retransmissions. However, depending on the erasure-correction code employed and the way the code is computed, additional buffers may be required to support encoding.

We first consider the worst-case scenario where redundant packets are computed on-the-fly. Additionally, we assume that video packets of a parity group must all be available before encoding. Then for a system with D video packets and R redundant packets per parity group, the server will need to allocate (D+R) buffer units for encoding. Hence the amount of buffer required for one multicast video stream is $$B_{FEC} = (D+R)Q_S \quad (39)$$

This additional buffer requirement can be reduced in two ways. The first way is to use special erasure-correction codes that process video packets sequentially. For example, the parity coding scheme for R=1 can be computed on a packet-by-packet basis. Only one packet's worth of buffer is required to store the intermediate computation results while buffers for transmitted video packets can be released immediately. This translates into a buffer requirement of only one packet per stream (i.e. $B_{FEC} = Q_S$).

The second way is to use pre-computed redundant packets. For example, the redundant packets can be computed beforehand and stored along video data in the disks. In this way, no encoding needs to be performed and hence no additional buffer is required. The tradeoffs are overheads in disk storage and disk I/O bandwidth.

VII. Analysis of Hybrid ARQ/FEC

A. Passive Recovery

In passive recovery, the probability of a lost packet being unrecoverable by FEC is given by (30), i.e. the residual loss probability $\epsilon_i$. The amount of traffic overhead incurred by ARQ would then be given by (5) and (6), with $p_i$ replaced by the corresponding residual loss probability $\epsilon_i$. Hence, given a redundancy of R, the traffic overhead can be computed from $$H_{hybrid}(R) = \frac{R}{D} + \sum_{i=0}^{N-1}\left(\sum_{j=1}^{K_i}(j-1)(\epsilon_i^{j-1}(1=\epsilon_i))\right) \quad (40)$$

where $$K_i = \left\lceil \frac{\ln p_{max}}{\ln \epsilon_i} \right\rceil.$$

The level of redundancy R essentially determines how many losses are to be recovered through FEC, while the rest will be recovered by ARQ. The key is that traffic overhead incurred in FEC is fixed irrespective of number of receivers while overhead for ARQ increases with number of receivers. Hence, for systems with many receivers, the extra overhead in increasing R can be more than offset by the corresponding reduction in ARQ overhead. From (31), the maximum amount of redundancy needed is $R_{FEC}$. Hence the optimal amount of redundancy for hybrid ARQ/FEC, denoted by $R_{hybrid}$, required to minimize the traffic overhead as given by (40) can be determined by choosing $R_{hybrid}=0, 1, \ldots, R_{FEC}$ such that $H_{hybrid}(R_{hybrid})$ is minimized.

Note that this hybrid ARQ/FEC algorithm reduces to ARQ when $R_{hybrid}=0$ and reduces to FEC when $R_{hybrid}=R_{FEC}$. Furthermore, as we choose $R_{hybrid}$ such that $H_{hybrid}(R_{hybrid})$ is minimized, this hybrid algorithm performs at least as good as either ARQ or FEC alone.

At the receiver, we need to reserve buffer space not only for erasure correction, but also for retransmissions as well. FIG. 5 depicts the worst-case scenario for retransmitting packets not recoverable by erasure correction. Since retransmission starts after the entire parity group is received, the receiver can send a single request back to the server for all lost packets in the parity group. If one or more retransmitted packets are lost again, the next round of retransmission starts immediately after the last retransmitted packet has timed out in the current round. This process repeats until either all packets are received or the maximum number of retransmission attempts is reached.

At the server, we assume that retransmitted packets are sent at normal data rate, i.e. with a transmission time of $T_{tran}$, and an inter-packet time of (equation). The server $\tilde{T}_S$. The server deliberately smooths out the retransmission traffic to avoid causing congestion in the network or at the receiver.

As the receiver will attempt at most $(K_i-1)$ retransmission for a video packet, the worst-case delay incurred for receiving any packet within the parity group is given by see (Fit. 5):

$$[(D+R-1)\tilde{T}_S + T_{tran} T_i + T_i^+] + (K_i-1)[T_i + T_i^+ + (D-1)\tilde{T}_S + T_{tran} + T_i + T_i^+] \quad (41)$$

where the first term is the worst-case delay incurred in waiting for the whole parity group to arrive and the second term is the worst-case delay incurred in those $(K_i-1)$ retransmission assuming all D video packets are lost in every transmission (and retransmission) rounds except the last one. Hence, the upper bound for $A_i^j$ becomes:

$$A_i^j \leq (T_{start} + j\tilde{T}_S + (D+R-1) \\ \tilde{T}_S + T_{tran} + T_{tran} + T_i + T_i^+) + (K_i-1)((D-1) \\ \tilde{T}_S + T_{tran} + 2(T_i + T_i^+)) \quad (42)$$

Together with the continuity condition in (8) and (9), we can obtain $Y_i$ from:

$$\max\{A_i^j\} \leq \min\{P_i^j\} \quad (43)$$

Substituting (42) for the L.H.S. and (16) for the R.H.S. we can then obtain the requirement on $Y_i$:

$$Y_i \geq \frac{(K_i-1)\left(\frac{(D-1)\tilde{T}_S + T_{tran} +}{2(T_i + T_i^+)}\right) + (T_i^+ - T_i^-)}{\tilde{T}_S} + D + R \quad (44)$$

Again as the lower bound for $A_i^j$ is not changed, the requirement for $Z_i$ is the same as FEC:

$$Z_i \geq \frac{(T_i^+ - T_i^-)}{\tilde{T}_S} + 1 \quad (45)$$

The receiver buffer requirement for receiver i is then given by $$L_{hybrid}(i) = \left\lceil \frac{(K_i-1)\left(\frac{(D-1)\tilde{T}_S + T_{tran} +}{2(T_i + T_i^+)}\right)}{\tilde{T}_S} \right\rceil + \left\lceil \frac{T_i^+ - T_i^-}{\tilde{T}_S} \right\rceil + D + R + 1 \quad (46)$$

At the server, two types of additional buffers are needed to support passive recovery. First (D+R) buffers are needed to support erasure-correction encoding. Second, buffers holding transmitted packets cannot be released until the (i.e. $K_i-1$) retransmission request arrives. According to FIG. 5, the client starts requesting retransmission after the whole parity group is received, i.e. after a maximum delay of (c.f. FIG. 5).

$$\tilde{r}_i = (D+R-1)\tilde{T}_S + T_{tran} + T_i + T_i^+ \quad (47)$$

Hence, the delay for the first retransmission request to arrive at the server is at most $$r_i^1 = \tilde{r}_i + (T_i + T_i^+) \quad (48)$$

Similarly, delay for the $n^{th}$ retransmission request to arrive is at most $$r_i^n = \tilde{r}_i + (T_i + T_i^+) + (n-1)(T_i + T_i^+ + (D-1)\tilde{T}_S + T_{tran} + T_i + T_i^+) \quad (49)$$

Given that new groups of D packets are being generated at a rate of one group per $DT_S$, there will be at most $$\left\lceil \frac{r_i^{K_i-1}}{DT_S} \right\rceil \quad (50)$$

groups co-existing simultaneously for a multicast video stream. Together with redundant packets, each parity group requires $(D+R)Q_S$ bytes of buffer and hence the total buffer requirement can be obtained from $$B_{hybrid} = Q_S(D+R) \left\lceil \frac{r_i^{K_i-1}}{DT_S} \right\rceil \quad (51)$$

B. Active Recovery

With active recovery, retransmission is needed only if there are more than R lost packets because otherwise the lost packets would be recoverable by erasure correction already. For example, if there are exactly m packets lost in a parity group, only (m−R) of the m lost packets need to be retransmitted. On the other hand, retransmission can start as soon as the receiver detects the loss of the $(R+1)^{th}$ packet without waiting for the whole parity group to arrive. We assume that given there are m (m>R) packets lost in the first transmission of a parity group, the receiver will request retransmission for the lat (m−R) of these lost packets. As each one of these (m−R) packets will be retransmitted for at most $(K_i-1)$ times, the probability that a retransmitted packet cannot be recovered is equal to $p_i^{K_i-1}$. Hence, the probability that w of the (m−R) packets being recoverable by retransmission is given by $$u_i(w) = \binom{m-R}{w}(p_i^{K_i-1})^w (1-p_i^{K_i-1})^{m-R-w}, \quad (52)$$

$$(m-R) \geq w \geq 0, K_i > 1$$

Using this equation, we can compute the conditional probability of having k(m≧k≧R) lost packets in the parity group after retransmissions given there are m lost packets from $$\Phi_i(k, m) = u_i(k-R) \quad (53)$$
$$= \binom{m-R}{k-R}(p_i^{K_i-1})^{K-R}(1-p_i^{K_i-1})^{m-k},$$
$$m \geq k \geq R$$

Now, the probability that there are exactly m packets lost in a parity group is given by $$Pr\{m \text{ lost in a parity group}\} = \binom{D+R}{m}p_i^m(1-p_i)^{D+R-m} \quad (54)$$

Therefore we can obtain the unconditional probability of having k(k≧R) lost packets after retransmission from $$\Phi_i(k) = \sum_{m=k}^{D+R} \Phi_i(k, m) Pr\{m \text{ lost in a parity group}\}, \quad k \geq R \quad (55)$$
$$= \sum_{m=k}^{D+R} \binom{m-R}{k-R}(p_i^{K_i-1})^{k-R}(1-p_i^{K_i-1})^{m-k}\binom{D+R}{m}p_i^m(1-p_i)^{D+R-m}, \quad k \geq R$$

Now if k>R, then erasure correction will not succeed. Assuming the erasure-correction code is systematic, then the loss probability for video packets in a parity group is given by (29). Hence, we can obtain the residual loss probability by conditioning on k:

$$\varepsilon_i(R) = \sum_{k=R+1}^{D+R} \frac{k}{D+R} \Phi_i(k) \quad (56)$$

To determine the traffic overhead, we first need to find $K_I$. Given R and the loss limit $p_{max}$, we can compute the minimum value for $K_i$ such that the condition $$\epsilon_i(R) \leq p_{max} \quad (57)$$

is satisfied. Once $K_i$ is known, we can obtain the amount of traffic overhead incurred in retransmission for each lost packet from $$h_i = \sum_{j=1}^{K_i-1} j(p_i^{j-1}(1-p_i)) \quad (58)$$

Hence given there are m(m>R) lost packets in a parity group, the expected amount of traffic overhead incurred is given by $(m-R)h_i$. The average amount of traffic overhead incurred by all N receivers can then be obtained from $$h(R) = \frac{1}{D}\sum_{i=0}^{N-1}\sum_{m=R+1}^{D+R}(m-R)h_i\binom{D+R}{m}p_i^m(1-p_i)^{D+R-m} \quad (59)$$
$$= \frac{1}{D}\sum_{i=0}^{N-1}\sum_{m=R+1}^{D+R}\sum_{j=1}^{K_i-1}\binom{D+R}{m}j(m-r)p_i^{m+j-1}(1-p_i)^{D+R-m+1}$$

and the total traffic including redundancy is $$H_{hybrid}(R) = \frac{R}{D} + h(R) \quad (60)$$

To minimize the total server bandwidth requirement, one can choose $R_{hybrid}=0, 1, \ldots, R_{FEC}$ such that $H_{hybrid}R_{hybrid}$ is minimized.

To determine the receiver buffer requirement for video playback continuity, we note that the receiver starts requesting retransmission as soon as (R+1) packet losses are detected. Hence, the worst-case arrival time (i.e. after $(K_i-1)$ retransmissions) for packet x must be larger than y if x>y. In the worst-case scenario, all packets (except those not retransmitted) must have arrived (or will never arrive) by the time the last packet of the parity group arrives after $(K_i-1)$ retransmissions (see FIG. 6). Therefore the packet arrive time is bounded from above by $$A_i^j \leq (T_{start} + j\tilde{T}_S + (D+R-1)$$
$$\tilde{T}_S + T_{tran} + T_i + T_i^+) + (K_i - 1)(T_{tran} + 2(T_i + T_i^+))$$  (61)

Using similar derivations, we can obtain $Y_i$ as $$Y_i \geq \frac{(K_i - 1)(\tilde{T}_S + T_{tran} + 2(T_i + T_i^+)) + (T_i^+ - T_i^-)}{\tilde{T}_S} + D + R \quad (62)$$

and $Z_i$ as in (45). The total receiver requirement becomes $$L_{hybrid}(i) = \left\lceil \frac{(K_i - 1)(\tilde{T}_S + T_{tran} + 2(T_i + T_i^+)) + (T_i^+ - T_i^-)}{\tilde{T}_S} \right\rceil + \quad (63)$$
$$\left\lceil \frac{T_i^+ - T_i^-}{\tilde{T}_S} \right\rceil + D + R + 1$$

To determine the amount of server buffer required to support active recovery, we notice that delay for the $n^{th}$ retransmission of the last packet in a parity group is given by $$r_i^n = \tilde{r}_i + (T_i + T_i^+) + (n-1)(T_{tran} + 2(T_i + T_i^+)) \quad (64)$$

Using derivations similar to Section VII-A, the server buffer requirement can be found to be $$B_{hybrid} = Q_S(D+R) \left\lceil \frac{r_i^{K_i - 1}}{DT_S} \right\rceil \quad (65)$$

Performance Evaluation

In this section, we compare the performance of the proposed hybrid ARQ/FEC algorithm with ARQ and FEC with respect to various system parameters. The values of the system parameters used for numerical evaluation are summarized in Table 1.

A. Traffic Overhead versus Packet-Loss Probability

FIG. 7 plots the traffic overhead at the server link versus packet-loss probabilities ranging from 0.001 to 0.1. The main observation here is that ARQ incurs far more traffic overhead than either FEC or hybrid ARQ/FEC for both 100 and 1000 receivers. This illustrates the well-known scalability problem in using ARQ for multicast data distribution. Secondly, we observe that both variants of the proposed hybrid algorithms performs equal to or better than the FEC algorithm, which in turns outperform ARQ by a large margin. Thirdly among the two hybrid variants, active recovery performs best. This result shows that the proposed hybrid algorithm is superior to both ARQ and FEC for a wide range of packet-loss probabilities.

B. Traffic Overhead versus Number of Receivers

FIG. 8 plots the traffic overhead versus the number of receivers in the multicast session. We observe that ARQ performs better than FEC when the number of receivers is smaller than 32, and FEC performs better otherwise. On the other hand, the proposed hybrid algorithms perform equal to or better than both ARQ and FEC, with active recovery performs slightly better. Hence, the proposed algorithm not only can be scaled up to serve a large number of receivers, but also can maintain a low traffic overhead when the number of receivers is small.

C. Traffic Overhead versus Loss Limit

FIG. 9 plots the traffic overhead versus the loss limit tolerable by the media. The result shows that FEC performs better than ARQ, and the hybrid algorithms perform even better for a wide range of loss limits. Once again, the active recovery scheme performs slightly better than the passive recovery scheme due to the better utilization of the redundant packets.

D. Traffic Overhead versus Parity Group Size

FIG. 10 plots the traffic overhead for parity group sizes ranging from 2 to 50. Obviously, ARQ is independent of the parity group size and hence remains constant in this figure. For FEC and the hybrid algorithms, increasing the parity group size generally reduces the amount of traffic overhead at the server. This is expected because the traffic overhead is directly proportional to the ration R/D as expressed in (32), (40) and (60). However, the parity group size also affects the receiver buffer requirement as well (FIG. 11). Interestingly, increasing the parity group size does not necessary raise the receiver buffer requirement. In some cases, like going from D=10 to D=12 in Hybrid-Passive with 100 receivers, the buffer requirement decreases substantially for the increase in parity group size. This observation is explained by the fact that the increase in parity group size results in a reduction in the need for retransmission. For the Hybrid-Passive with 100 receivers case, increasing D=10 to D=12 also increases the optimal amount of redundancy from R=1 to R=2. This further decreases the maximum number of transmissions needed from $K_i$=2 to $K_i$=1 (i.e. FEC only), which reduces the receiver buffer requirement substantially.

E. Receiver Buffer Requirement versus Packet-Loss Probability

FIG. 12 plots the receiver buffer requirement versus packet-loss probabilities ranging from 0.001 to 0.1. The result shows that FEC has the lowest receiver buffer requirement under the operating conditions as set forth in Table 1. ARQ generally requires more receiver buffers than FEC and the hybrid algorithms except for loss probabilities below 0.015 and over 0.07. As we choose the hybrid algorithms' operating parameters to minimize traffic overhead, the receiver buffer requirement fluctuates between the ARQ curve and the FEC curve for different loss probabilities. If it is desirable to incorporate the cost of receiver buffers, we can modify the optimization procedure in choosing R so that an integrated objective function taking into both traffic overhead and buffer cost is optimized, rather than based solely on $H_{hybrid}(R)$.

F. Server Buffer Requirement

The server buffer requirement plots (not shown) are similar to the receiver buffer requirement plots. This is because due to retransmissions, longer buffer-holding time at the receiver also implies longer buffer-holding time at the server. With the system parameters in Table 1, the server buffer requirements for all cases (i.e. ARQ, FEC, Active and Passive Hybrid ARQ/FEC) remain below 200 KB per stream for a wide range of parameters (N=1 . . . 1000, $p_i$=0.0 . . . 0.1). Therefore a 100-stream server would need no more than 20 MB of memory for error-control. Given the rapid price drops and capacity gains in memory chips, we can conclude that server buffer requirement will not be a significant factor in selecting error-control algorithms.

G. Heterogeneous Packet-Loss Probabilities

So far, the results are computed with all receivers having the same packet-loss probability. In practice, different receivers will likely experience different packet loss probabilities because of different network conditions, different processing power, etc. To evaluate the performance of the proposed hybrid algorithms under heterogeneous receiver conditions, we set the receivers' packet-loss probabilities according to a uniform distribution over a range $P_L$ and $P_H$. Specifically, the packet-loss probability for receiver I is given by $$P_i = P_L + (P_H - P_L)\frac{i}{N-1} \quad (66)$$

where $P_L$ and $P_H$ is defined by the average packet-loss probability $P_M$ and the range factor $\gamma$.

$$P_L = P_M(1-\gamma) \quad (67)$$

$$P_H = P_M(1+\gamma) \quad (68)$$

Setting $P_M$=0.25, we plot the traffic overhead for $0 \leq \gamma \leq 1$ in FIG. 13. As expected, ARQ is relatively insensitive to receiver heterogeneity. By contrast, FEC's performance deteriorates for increasing receiver heterogeneity because a fixed amount of redundancy is used for all receivers. The proposed hybrid algorithms have lower traffic overhead than both ARQ and FEC for the entire spectrum of $0 \leq \gamma \leq 1$. Again, the active recovery mode performs better than the passive recovery mode due to the better utilization of redundant packets.

IV. References

G. Carle, and E. W. Biersack, "Survey of Error Recovery Techniques for IP-Based Audio-Visual Multicast Applications," IEEE Network, vol. 11(6), November/December 1997, pp. 24-36.

S. Floyd, V. Jacobson, C. Liu, S. McCanne, and L. Zhang, "A Reliable Multicast Framework for Light-weight Sessions and Application Level Framing," IEEE/ACM Transactions on Networking, vol. 5(6), December 1997, pp. 784-803.

J. Lin, and S. Paul, "RMTP: A Reliable Multicast Transport Protocol," Proc. IEEE INFOCOM "96, San Francisco, Calif., USA, March 1996.

X. R. Xu, A. C. Myers, H. Zhang, and R. Yavatkar, "Resilient Multicast Support for Continuous-Media Applications," Proc. 7.sup.th International Workshop on Network and Operating System Support for Digital Audio and Video (NOSSDAV"97), St. Louis, Mo., USA, 1997, pp. 183-194.

C. Papadopoulos, G. Parulkar, and G. Varghese, "An Error Control Scheme for Large-scale Multicast Applications," Proc. IEEE INFOCOM "98, San Francisco, Calif., USA, March 1998.

A. M. Costello, "Search Party: Using Randomcast for Reliable Multicast with Local Recovery," Technical Report No. UCB//CSD-98-1011, University of California Berkeley, Calif., August 1998.

M. T. Lucas, B. J. Dempsey, and A. C. Weaver, "Distributed Error Recovery for Continuous Media Data in Wide-Area Multicast," Technical Report CS95-52, Department of Computer Science, University of Virginia, July 1995.

J. Nonnenmacher, E. W. Biersack, and D. Towsley, "Parity-Based Loss Recovery for Reliable Multicast Transmission," In Proceedings of ACM SIGCOMM"97, pp. 289-300, Cannes, France, September, 1997.

D. Rubenstein, J. Kurose, and D. Towsley, "Real-Time Reliable Multicast Using Proactive Forward Error Correction," Proc. IEEE NOSSDAV "98, Cambridge, UK, July 1998.

S. Pejhan, M. Schwartz, and D. Anastassiou, "Error Control Using Retransmission Schemes in Multicast Transport Protocols for Real-Time Media," IEEE/ACM Transactions on Networking, vol. 4(3), June 1996, pp. 413-427.

X. Li, S. Paul, P. Pancha, and M. Ammar, "Layered Video Multicast with Retransmission (LVMR): Evaluation of Error Recovery Schemes," Proc. 7.sup.th International Workshop on Network and Operating System Support for Digital Audio and Video (NOSSDAV"97), St. Louis, Mo., USA, 1997, pp. 161-172.

Y. B. Lee, "Concurrent Push—A Scheduling Algorithm for Push-Based Parallel Video Servers," To appear in IEEE Transactions on Circuits and Systems for Video Technology, December 1998.

S. B. Wicker, Error Control Systems for Digital Communication and Storage, Prentice-Hall, Englewood Cliffs, N.J., 1995.

H. Ohta and T. Kitami, "A Cell Loss Recover Method Using FEC in ATM Networks," IEEE Journal of Selected Areas in Communications, vol. 9, December 1991, pp. 1471-83.

N. Sacham and P. McKenny, "Packet Recovery in High-Speed Networks Using Coding," Proc. INFOCOM "90, San Francisco, Calif., June 1990, pp. 124-131.

Throughout the description and drawings, example embodiments are given with reference to specific configurations. One of ordinary skill in the art would appreciate that other embodiments and configurations are possible. Such other configurations are all within the scope of this invention, since with the knowledge provided by the description and drawings one of ordinary skill in the art would be able to implement the other embodiments and configurations without undue experimentation.

The invention claimed is:

1. A method for receiving video content at a receiver, the method comprising:
   receiving packets from a multicasted group of packets, wherein the multicasted group of packets include data and error-correction information for the data;
   if packets received without error in the receiving step include less than all the data, whereby some of the data has been lost, hereinafter referred to as lost data, then:
      sending a message based on identity of at least some of the lost data;
      receiving a retransmission data via a retransmission triggered by the sent message, wherein the retransmission data includes less than all of the lost data;
      recovering all of the lost data using information from the packets received without error in the receiving packets step and using the received retransmission data; and
      buffering received data at the receiver, including the retransmission data, to allow for continuous play of the video content received at the receiver.

2. The method according to claim 1, wherein the message identifies and requests retransmission of less than all lost data packets of the multicasted group of packets; and wherein the retransmission includes retransmission of the less than all lost data packets of the multicasted group of packets.

3. The method according to claim 2, wherein the sending step includes sending at least a portion of the message, even before every packet of the multicasted group of packets has either arrived at the receiver or been determined as lost to the receiver.

4. A method for delivering continuous media in a network, comprising:
   buffering the continuous media and redundancy data for implementing forward error correction;
   transmitting the continuous media to one or more receivers over the network to allow for continuous play of the continuous media by the one or more receivers; and
   retransmitting at least some of the continuous media over the network to one or more of the receivers in response to a retransmission request from the one or more of the receivers.

5. The method according to claim 4, wherein the continuous media is video data.

6. The method according to claim 4, wherein the network is a broadband network with quality-of-service support.

7. The method according to claim 4, wherein the broadband network with quality-of-service support includes a broadband residential network.

8. The method according to claim 4, wherein the one or more receivers includes a plurality of receivers.

9. The method according to claim 4, wherein the one or more receivers has a buffer for buffering the continuous media, retransmission data for implementing automatic repeat request, and redundancy data for implementing forward error correction.

10. The method according to claim 4, wherein the retransmission request is associated with a subset of lost packets at the one or more receivers, and wherein not all the lost packets are retransmitted.

11. The method according to claim 4, wherein the redundancy data is computed on-the-fly.

12. The method according to claim 4, wherein the redundancy data is pre-computed.

13. The method of claim 4, wherein the continuous media, including the retransmitted continuous media, is video data.

14. The method of claim 13, further comprising:
playing the continuous media, including the retransmitted continuous media, as a video.

15. A method for delivering continuous media over a network, comprising:
buffering, at a receiver, continuous media, retransmission data for implementing automatic repeat request, and redundancy data for implementing forward error correction;
configuring buffer space at the receiver to allow for continuous play at the receiver of the continuous media;
performing, at the receiver, forward error correction to correct errors in the buffered continuous media using the buffered redundancy data; and
performing by the receiver automatic repeat request to request from a server transmission of at least some of the continuous media.

16. The method according to claim 15, wherein the continuous media is video data.

17. The method according to claim 15, wherein the network is a broadband network with quality-of-service support.

18. The method according to claim 17, wherein the broadband network with quality-of-service support includes a broadband residential network.

19. The method according to claim 15, wherein the redundancy data is received from a buffer of the server.

20. The method according to claim 15, wherein the automatic repeat request is associated with a subset of lost packets, and wherein not all the lost packets are requested.

21. The method according to claim 15, wherein the redundancy data is computed on-the-fly.

22. The method according to claim 15, wherein the redundancy data is pre-computed.

23. The method of claim 15, wherein the continuous media, including the requested retransmission of continuous media, is video data.

24. The method of claim 23, further comprising:
receiving the requested retransmission of continuous media; and
playing the continuous media, including the retransmitted continuous media, as a video.

25. A digital video apparatus adapted for video-on-demand or digital video multicasting or digital video broadcasting, for processing continuous media data, retransmission data for implementing automatic repeat request, and redundancy data for implementing forward error correction, received through a network with quality-of-service, comprising:
a receiver adapted to receive a continuous media data and redundancy data and to request a subset of lost data of continuous media data to receive a retransmission of the subset of the lost data of the continuous media data wherein not all the lost data is requested, the receiver being further adapted to perform erasure correction using the retransmitted subset of the lost data at least partially.

26. The digital video apparatus according to claim 25, wherein the continuous media data and the redundancy data constitute a parity group and the receiver initiates receiving the transmission without waiting for the whole parity group to arrive.

27. The digital video apparatus according to claim 25, wherein the network is a broadband residential network.

28. The digital video apparatus according to claim 25, wherein the continuous media is multicasted.

29. A digital video apparatus adapted for video-on-demand or digital video multicasting or digital video broadcasting, for processing continuous media data, retransmission data for implementing automatic repeat request, and redundancy data for implementing forward error correction, received through a network with quality-of-service, comprising:
means for receiving continuous media data and redundancy data and to request a subset of lost data of continuous media data to receive a transmission of the subset of the lost data of the continuous media data wherein not all the lost data is requested; and
means for performing erasure correction using the retransmitted subset of the lost data at least partially.

30. The digital video apparatus according to claim 29, wherein the continuous media data and the redundancy data constitute a parity group and the means for receiving initiates receiving the retransmission without waiting for the whole parity group to arrive.

31. The digital video apparatus according to claim 29, wherein the network is a broadband residential network.

32. The digital video apparatus according to claim 29, wherein the continuous media is multicasted.

33. A method for delivering continuous video in a network, comprising:
transmitting video packets containing continuous video, and redundancy data packets for implementing forward error correction to one or more receivers over the network to allow for continuous play of the continuous video by the one or more receivers; and
retransmitting at least some of the video packets over the network to one or more of the receivers in response to a transmission request from the one or more of the receivers.

* * * * *